US009918584B2

(12) United States Patent
Bergdahl et al.

(10) Patent No.: US 9,918,584 B2
(45) Date of Patent: Mar. 20, 2018

(54) DEVICE FOR IN-CUP-PREPARATION OF A BEVERAGE (75) Inventors: Johan Bergdahl, Lausanne (CH); John Meldrum, Orbe (CH); David J. Harrison, New Milford, CT (US); David Hamel, Chernex (CH); Michael (Mischa) Stieger, Staad (CH)

(73) Assignee: Nestec S.A., Vevey (CH)

( * ) Notice: Subject to any disclaimer, the term of this patent is extended or adjusted under 35 U.S.C. 154(b) by 1293 days.

(21) Appl. No.: 13/120,612

(22) PCT Filed: Sep. 22, 2009

(86) PCT No.: PCT/EP2009/062279
§ 371 (c)(1),
(2), (4) Date: Mar. 23, 2011

(87) PCT Pub. No.: WO2010/034722
PCT Pub. Date: Apr. 1, 2010

(65) Prior Publication Data
US 2011/0177220 A1 Jul. 21, 2011

(30) Foreign Application Priority Data
Sep. 24, 2008 (EP) .................................... 08164987

(51) Int. Cl.
*A47J 31/44* (2006.01)
*A47J 31/40* (2006.01)
(Continued)

(52) U.S. Cl.
CPC ............. *A47J 31/401* (2013.01); *A47J 31/46* (2013.01)

(58) Field of Classification Search
CPC ................................ A47J 31/401; A47J 31/46
(Continued)

(56) References Cited

U.S. PATENT DOCUMENTS 3,986,642 A * 10/1976 Selvia et al. ............... 222/129.1
4,164,964 A * 8/1979 Daniels ........................ 141/329
(Continued)

FOREIGN PATENT DOCUMENTS

EP 0060645 9/1982
EP 0373126 6/1990
(Continued)

OTHER PUBLICATIONS

International Search Report for Application No. PCT/EP2009/062279—dated Dec. 7, 2009; 10 Pages.
(Continued)

*Primary Examiner* — David Angwin
*Assistant Examiner* — John J Norton
(74) *Attorney, Agent, or Firm* — K&L Gates LLP (57) ABSTRACT The present invention proposes a beverage production device for preparing a beverage from a beverage concentrate contained in a receptacle, comprising a support means (1) for supporting the receptacle (13), a plate member (2) arranged vertically to the support means, the plate member (2) comprising at least four outlet nozzles (4) for injecting a fluid jet (A) into the receptacle (13), liquid supply means (6) connected to the outlet nozzles (4), wherein at least two of the outlet nozzles (4) are designed to direct a fluid jet (A3, A4) to an inner side wall (13*b*) of the receptacle (13) and said outlet nozzles (4) are arranged at different angles (a) with respect the vertical, and wherein at least two of the outlet nozzles (4) are designed to direct a fluid jet (A1, A2) to the bottom of the receptacle (13*a*) and said outlet nozzles (4) are arranged at different angles (β) with respect to the vertical.

8 Claims, 4 Drawing Sheets (51) Int. Cl.
*A47J 31/46* (2006.01)
*A23F 5/00* (2006.01)
*A23L 2/00* (2006.01)

(58) Field of Classification Search
USPC .............. 99/287, 279, 275, 302 R, 315; 222/129.1, 129.3, 145.1
See application file for complete search history.

(56) References Cited

U.S. PATENT DOCUMENTS

| | | | |
|---|---|---|---|
| 4,173,925 A * | 11/1979 | Leon | 99/348 |
| 4,301,717 A * | 11/1981 | Knees | 99/348 |
| 4,388,338 A * | 6/1983 | Wittenborg | 426/590 |
| D307,669 S * | 5/1990 | Inouye | D7/620 |
| 5,555,796 A * | 9/1996 | Kortschot et al. | 99/453 |
| 5,573,214 A * | 11/1996 | Jones et al. | 248/311.2 |
| 6,634,782 B2 * | 10/2003 | Barton et al. | 366/142 |
| 7,353,850 B2 * | 4/2008 | Greiwe et al. | 141/279 |
| 7,478,584 B2 * | 1/2009 | Turi | 99/284 |
| 7,648,049 B1 * | 1/2010 | Lassota | 222/129.1 |
| 7,669,519 B2 * | 3/2010 | Pope et al. | 99/315 |
| 8,056,754 B2 * | 11/2011 | Stoner | 220/533 |
| 2005/0269471 A1 * | 12/2005 | Wagner | 248/311.2 |
| 2006/0266225 A1 * | 11/2006 | Hammad | 99/279 |
| 2007/0068969 A1 * | 3/2007 | Orzech et al. | 222/214 |
| 2007/0075205 A1 * | 4/2007 | Shin et al. | 248/311.2 |
| 2007/0080169 A1 * | 4/2007 | Sher et al. | 222/129.1 |
| 2008/0093382 A1 * | 4/2008 | Sher et al. | 222/129 |

FOREIGN PATENT DOCUMENTS

| | | | |
|---|---|---|---|
| EP | 1155646 | 11/2001 | |
| EP | 1348364 | 10/2003 | |
| EP | 1407698 | 4/2004 | |
| EP | 1407698 A1 * | 4/2004 | |
| GB | 1367354 | 9/1974 | |
| GB | 1367354 A * | 9/1974 | A47J 31/401 |
| GB | 2019813 | 11/1979 | |

OTHER PUBLICATIONS

Written Opinion of the International Searching Authority for Application No. PCT/EP2009/062279—dated Dec. 7, 2009; 8 Pages.

* cited by examiner

DEVICE FOR IN-CUP-PREPARATION OF A BEVERAGE

FIELD OF THE INVENTION

The present invention relates to a device and a system for preparing a beverage from a food substance provided in a receptacle. In particular, the invention relates to such a device which enables the preparation of a beverage from a beverage concentrate which is provided to a receptacle by supplying diluent jets to the receptacle.

BACKGROUND OF THE INVENTION

It is known to prepare beverages by mixing a beverage concentrate such as a dry powder and a liquid such as cold or hot water. Thereby, the following principle is generally applied for the beverage preparation. A beverage concentrate such as a dry powder is introduced into a receptacle such as a coffee or tea cup. Then, the cup is placed below an outlet of a dilution and mixing device which introduces at least a stream or jet of water to the cup in order to enable an interaction of the beverage concentrate and the hot water. Accordingly, the beverage concentrate is dissolved and eventually frothed by the hot water in order to prepare a beverage. However, the existing beverage preparation devices which make use of the above outlined principle suffer the inconvenience that the beverage concentrate is not fully diluted and thus, residua of the concentrate are present in the prepared beverage. This leads to a non-uniform and thus to a non-inviting appearance of the prepared beverage.

In addition, during provision of beverage concentrate to a receptacle, parts of the concentrate may stick to the inner side walls of the receptacle and can thus not be fully dissolved in the beverage preparation process. Moreover, if the beverage concentrate is not fully dissolved in the liquid provided to the receptacle, the taste of the beverage may vary from the intended beverage taste. Hence, particularly for the beverage preparation of hot beverages such as tea or coffee, it is desired to have a reproducible strength respectively concentration of the beverage to be prepared, wherein the concentration of the beverage corresponds to the amount of beverage concentrate provided to the receptacle and does not vary for each preparation. Therefore, a device for the preparation of a beverage according to the above stated principle is sought-after, which enables a full dissolution of the whole amount of beverage concentrate provided to the receptacle.

EP 0 060 645 A1 proposes an apparatus for dispensing liquid into a container at a dispensing station in which two or more nozzles are arranged symmetrically around a central axis and are fed with liquid from a reservoir by a pump. Thereby, the nozzles are inclined from the vertical so as to produce a swirling action as the liquid hits the bottom of the container. Accordingly, in-cup dispensing in order to dissolve or disperse solid material placed at the bottom of a container is enabled.

Based on the prior art, the present invention aims at providing a device and a method for allowing an efficient beverage preparation on the basis of food concentrate provided to a receptacle which is mixed with hot water supplied by a jet dissolving device.

The present invention also aims at providing a device and a method for producing mixed drinks which consist of coffee and milk, for example cappuccino or latte macchiato. Thereby, the coffee beverage is preferably prepared separately to the milk beverage in order to enable a full interaction of the different food substances with liquid before the mixing of the different beverage types.

The present invention enables the preparation of beverages by effective dissolution of powder concentrates with hot water in a very short time.

Moreover, the present invention enables the production of beverages with an attractive appearance presenting simultaneously small and dense bubbles and a homogeneous dissolution.

In addition, the present invention enables the preparation of different beverages presenting different types of foam quality or even the absence of foam according to the type of prepared beverage.

Lastly, the present invention enables the preparation of complex beverages composed of different basic liquid beverages—one of which being preferably coffee—either foamed or not in a limited time.

OBJECT AND SUMMARY OF THE INVENTION

In a first aspect, the present invention relates to a beverage production device for preparing a beverage from a beverage concentrate contained in a receptacle, comprising:
a support means for supporting the receptacle,
a plate member arranged vertically to the support means, the plate member comprising at least four outlet nozzles for injecting a fluid jet into the receptacle, liquid supply means connected to the outlet nozzles, wherein at least two of the outlet nozzles are designed to direct a fluid jet to an inner side wall of the receptacle and said outlet nozzles are arranged in the plate member at different angles ($\alpha$) with respect the vertical, and wherein at least two of the outlet nozzles are designed to direct a fluid jet to the bottom of the receptacle and said outlet nozzles are arranged in the plate member at different angles ($\beta$) with respect to the vertical.

The outlet nozzles of the plate member are arranged at different angles with respect to the vertical. The angles at which the outlet nozzles are arranged with respect to the axis perpendicular to a bottom plane of the receptacle preferably have a value between $-10°$ and $+10°$. Accordingly, the fluid jets are not concentrated to one single point of intersection but are rather applied to different portions of the receptacle.

The two fluid jets are directed towards the bottom portion of the receptacle in order to provide the essential force for dissolving the portioned food substance provided to the receptacle. The other two fluid jets are directed towards an inner sidewall portion of the receptacle in order to avoid the risk of having the food substance introduced into the receptacle on the sidewalls of the receptacle. In addition, the dissolution of the food substance which may flow on top of the liquid beverage during the preparation is improved.

According to a specific embodiment, the four outlet nozzles are positioned along a ring shape.

In a preferred embodiment, liquid supply means are connected to the outlet nozzles. These liquid supply means are preferably designed to supply a pressurized liquid to the outlet nozzles. Accordingly, the liquid supply means preferably comprise a pump which is connected to a liquid supply such as a water reservoir or a water tap.

Moreover, the liquid supply means preferably comprise a boiler or a thermo-block suitable for heating the liquid provided by the reservoir. Accordingly, a heated pressurized liquid is provided to the outlet nozzles by the supply means.

With the device according to the present invention, it is possible to introduce a diluent such as cold or hot water into the receptacle to which a beverage concentrate has been introduced, in order to dissolve and eventually froth the concentrate. Thereby, the beverage concentrate is preferably a dry powder.

Due to the mixing of the food substance within the receptacle, no additional mixing chamber is necessary. Moreover, neither the mixing chamber nor another part of the beverage machine is contaminated by a bacteria sensitive fluid which results in a very hygienic beverage preparation.

In a preferred embodiment, the outlet nozzles of the plate member differ in their diameter which results in a different pressure of the fluid jets ejected by the corresponding outlet nozzle. Accordingly, the pressure of the ejected fluid jets can be adjusted for different kinds of beverages to be prepared by the device according to the invention.

In a preferred embodiment, the device further comprises control means. Said control means are preferably designed to selectively provide liquid from the liquid supply means to the outlet nozzles.

In a preferred embodiment, at least one additional outlet nozzle of bigger outlet diameter compared to the other outlet nozzles is provided at the plate member. Hence, a larger amount of liquid at low pressure can be provided to the receptacle, compared to the case wherein a smaller outlet diameter nozzle is applied. Accordingly, the preparation of the beverage is accelerated which reduces the waiting time for a user of the device. Besides, the liquid being injected at low pressure, it can be used for the preparation of a beverage without creation of froth above, which is the case for the preparation of tea beverages for example.

In a preferred embodiment, the plate member further comprises a spray nozzle which is designed to provide a spray of liquid to the receptacle. The spray nozzle is preferably selectively supplied with liquid from the liquid supply means. Accordingly, the spray nozzle can be operated independently of the outlet nozzles of the plate member. The spray nozzle is preferably used for the production of small bubbles on top of a beverage to be prepared such as a cappuccino. Effectively the spray nozzle may be used for preventing the formation of big bubbles on top of the beverage because its interaction with the big bubbles created by the jets issued from the nozzles lead to their disappearance.

The plate member and the support means of the device are preferably configured for being moved relatively in rotation and/or vertically to each other. Hence, during the beverage preparation process, dissolving or dispersion of the food substance is improved as the fluid jets ejected by the outlet nozzles are directed towards different portions of the receptacle during the beverage preparation. Moreover, any remaining food substance sticking to the side wall portions of the receptacle can be washed away due to the lifting respectively lowering or rotating movement.

Preferably, the plate member is connected to lifting means which enable a relative vertical movement of the plate member and the support means. Moreover, the receptacle support means are preferably connected to a rotary drive which enables the rotation of the receptacle about the vertical. Thereby, the rotary drive and the lifting means can be operated independently of each other.

The support means of the device preferably comprise positioning means for enabling a correct position of the receptacle with respect to the plate member. In particular, a centred positioning of the receptacle with respect to the nozzle outlets are positioned is desired in order to enable a correct positioning of the fluid jets ejected by the outlet nozzles with respect to the inner side wall and bottom portions of the receptacle.

The positioning means may be a protruding annular frame which can be connected to a base portion of the support means in order to enclose a lower portion of the receptacle. Preferably, the support means can be adjusted to different sizes and designs of receptacles. Accordingly, a receptacle can be correctly positioned with respect to the outlet nozzles in order to enhance the dissolving or dispersion of the food concentrate.

It should be understood that the support means may be any means which enable an interaction between the support means and the receptacle in order to enable a correct positioning and in particular a concentric position of the receptacle with respect to the outlet nozzles.

For example, the support means may be magnetic means arranged at the centre of the support means which are able to interact with a dedicated receptacle at least partially made of ferro-magnetic material such as to interact with the magnetic means of the support means. Accordingly, a concentric positioning of the receptacle with respect to the support means and thus with respect to the outlet nozzles is facilitated.

The receptacle to be used with the device according to the present invention is preferably of frustro-conical shape. The sidewalls of the container can be straight or angled without affecting the performance of the mixing of the jets. Preferably the sidewall of the receptacle is slightly angled in a conventional manner such as that used for paper or styrofoam coffee cups. Thus the container may have an inclined sidewall of from 1 to 15 degrees with respect to a symmetrical axis of the receptacle. Thereby, the side wall is preferably straight, i.e. the side wall is constantly inclined at the same angle with respect to the symmetrical axis of the receptacle. However, the side wall may as well be slightly rounded, i.e. the side wall of the receptacle may be of convex or concave shape. The receptacle has preferably a volume between 50 and 300 ml.

In a preferred embodiment, the control means of the device comprise a state machine which is designed to control the supply of liquid to the outlet nozzles of the plate member with respect to an accumulated volume of liquid dispensed from the supply means. Therefore, the supply means preferably comprise a flow meter which is able to detect an accumulated volume of the dispensed liquid for each beverage preparation cycle. According to this embodiment, the control means may open or close the outlet nozzles of the plate member with respect to a predefined time or an accumulated volume of liquid provided by the liquid supply means.

According to a second aspect the invention concerns a beverage production device for preparing a beverage from a beverage concentrate contained in a receptacle, comprising:
  a support means for supporting the receptacle,
  a plate member arranged vertically to the support means, the plate member comprising at least two outlet nozzles for injecting a fluid jet into the receptacle,
  liquid supply means connected to the outlet nozzles, wherein:
  at least one of the outlet nozzles is designed to direct a fluid jet to an inner side wall of the receptacle, and
  at least one of the outlet nozzles is designed to direct a fluid jet to the bottom of the receptacle, and
  the plate member comprises an outlet nozzle in connection with a coffee mixing chamber for injecting coffee into the receptacle.

The support means and the plate member preferably presents the same features as for the beverage production device according the first aspect of the present invention.

According to a specific embodiment, the plate member can comprise at least four outlet nozzles for injecting a fluid jet into the receptacle, wherein at least two of the outlet nozzles are designed to direct a fluid jet to an inner side wall of the receptacle and said outlet nozzles are arranged in the plate member at different angles ($\alpha$) with respect the vertical, and wherein at least two of the outlet nozzles are designed to direct a fluid jet to the bottom of the receptacle and said outlet nozzles are arranged in the plate member at different angles ($\beta$) with respect to the vertical.

The plate member can comprise an outlet nozzle in connection with a coffee mixing chamber for injecting coffee into the receptacle. Said coffee mixing chamber is preferably accessible from the outside of the device. Hence, if liquid provided by the liquid supply means interacts with a coffee extract provided to the coffee mixing chamber, a coffee beverage is prepared which can then be provided to the receptacle by means of the outlet of the plate member. According to a preferred embodiment, the device of the invention can also comprise means for alternatively closing, opening or restricting the outlet nozzle in connection with the coffee mixing chamber. These means can be a plate presenting two holes, one hole presenting a section at least as large as the outlet nozzle in connection with the coffee mixing chamber, and another hole presenting a section smaller than the outlet nozzle in connection with the coffee mixing chamber. This plate can be positioned relative to the plate member so that it is possible to make one of the two holes or no hole at all face the coffee mixing chamber outlet further to relative movement of the plate and the coffee mixing chamber outlet. This movement can be a rotational or translational sliding movement of the plate relative to the outlet. The means for alternatively closing, opening or restricting the outlet nozzle in connection with the coffee mixing chamber enables:

- when the means are closed, the production and retention of coffee beverage in the mixing chamber,
- when the means are opened, the delivery of the coffee beverage in the receptacle,
- when the means are restricted, the frothing of the coffee beverage delivered to the receptacle. Actually the smaller hole restricts the outlet of the nozzle so that it can create shear forces on the coffee jet exiting the coffee mixing chamber and create a better coffee cream.

Then these means solve the problems of shortening the preparation time of composite beverages, coffee being prepared and hold in the coffee mixing chamber while other beverages are prepared in the receptacle. These means solve also the problem of providing different coffee qualities by providing either frothed coffee with a layer of cream or non frothed coffee.

In a third aspect, the present invention relates to a method for the preparation of a beverage from a food substance, comprising the steps of:
a) providing a beverage concentrate to a receptacle,
b) directing at least two fluid jets to an inner bottom portion and at least two fluid jets to an inner side wall portion of the receptacle by means of outlet nozzles provided at a plate member arranged vertically to the receptacle, wherein the at least two fluid jets directed to the inner bottom portion of the receptacle and respectively the at least two fluid jets directed to the inner side wall portion of the receptacle are arranged at different angles ($\alpha$, $\beta$) with respect to the vertical.

The receptacle and the plate member are preferably moved rotationally and/or vertically in relation to each other during the preparation of the beverage. Hence, as the fluid jets are directed to different portions of the receptacle, effective dissolving or dispersion of the beverage concentrate provided to the receptacle is obtained.

Moreover, the outlet nozzles are preferably selectively provided with liquid from the liquid supply means, dependent on the accumulated volume of liquid provided to the outlet nozzles. According to this, it is for example possible, to open or close a particular outlet nozzle at a predefined stage of the beverage preparation. This may be for example be useful for the preparation of tea at which an outlet nozzle which provides a spray to the receptacle is opened for a predefined set of time at the end of the beverage preparation process. Hence, due to said spray ejected by the outlet nozzle deformation of big bubbles at the top of the beverage can be subdued.

Furthermore, in a preferred embodiment, the outlet nozzles are brought to approach a rim portion of the receptacle prior to the preparation of the beverage. Hence, an increase of pressure of the fluid jets which hit the surface of the beverage is obtained and thus, mixing of the beverage is enhanced. During the filling of the receptacle, said receptacle is preferably rotated as already described.

The receptacle presents preferably a frustoconical shape.

In a fourth aspect, the present invention relates to a method for the preparation of a coffee based beverage from a beverage concentrate and a coffee extract, comprising the steps of:
a) providing a beverage concentrate to a receptacle,
b) directing at least one fluid jets to an inner bottom portion and at least one fluid jet to an inner side wall portion of the receptacle by means of outlet nozzles provided at a plate member arranged vertically to the receptacle, the method further comprising the steps of producing a coffee beverage by:
c) providing a coffee extract to a mixing chamber connected to the liquid supply means and
d) discharging the resulting coffee beverage to the receptacle by means of an outlet at the plate member.

The coffee extract can be a liquid coffee concentrate or a soluble coffee powder.

Preferably the step c) of producing a coffee beverage is implemented during steps a), b) are implemented. In particular:
- during step c) of producing a coffee beverage, the outlet nozzle in connection with the coffee mixing chamber is closed, and
- during step d) of discharging the coffee beverage to the receptacle, the outlet nozzle in connection with the coffee mixing chamber is opened or restricted.

According to the present method, it is possible to prepare a coffee beverage in the coffee mixing chamber while another beverage is prepared directly in the receptacle by dilution of a beverage ingredient introduced in the receptacle with diluent introduced through the outlet nozzles. The both preparations can be made separately and simultaneously; it presents the advantage of shortening the time for preparing complex beverages made of different basic beverages that have to be prepared separately and finally mixed together. Once the coffee beverage and the other in-cup beverage have been prepared, the outlet nozzle in connection with the coffee mixing chamber can be opened and the coffee can be poured inside the receptacle. It is particularly advantageous for the preparation of mixed drinks such as latte macchiato or cappuccino, since the different beverage concentrates do not have to be mixed in one single mixing chamber. Besides, the coffee mixing chamber can be used for the preparation of coffee beverages only and thus, does not have to be cleaned after each beverage preparation cycle like for a bacteria sensitive fluid.

In a preferred embodiment, during step b), at least two fluid jets are directed to an inner bottom portion and at least two fluid jets are directed to an inner side wall portion of the receptacle by means of outlet nozzles provided at the plate member, wherein the at least two fluid jets directed to the inner bottom portion of the receptacle and respectively the at least two fluid jets directed to the inner side wall portion of the receptacle are arranged at different angles ($\alpha$, $\beta$) with respect to the vertical.

Whatever the aspect of the invention the beverage concentrate is preferably selected in the list of milk or milk-based powder, tea powder and chocolate based powder.

BRIEF DESCRIPTION OF THE DRAWINGS

Further features, advantages and objects of the present invention will become apparent for the skilled person when reading the following detailed description of embodiments of the present invention, when taken in conjunction with the figures of the enclosed drawings.

DETAILED DESCRIPTION OF THE FIGURES

Figure 1:
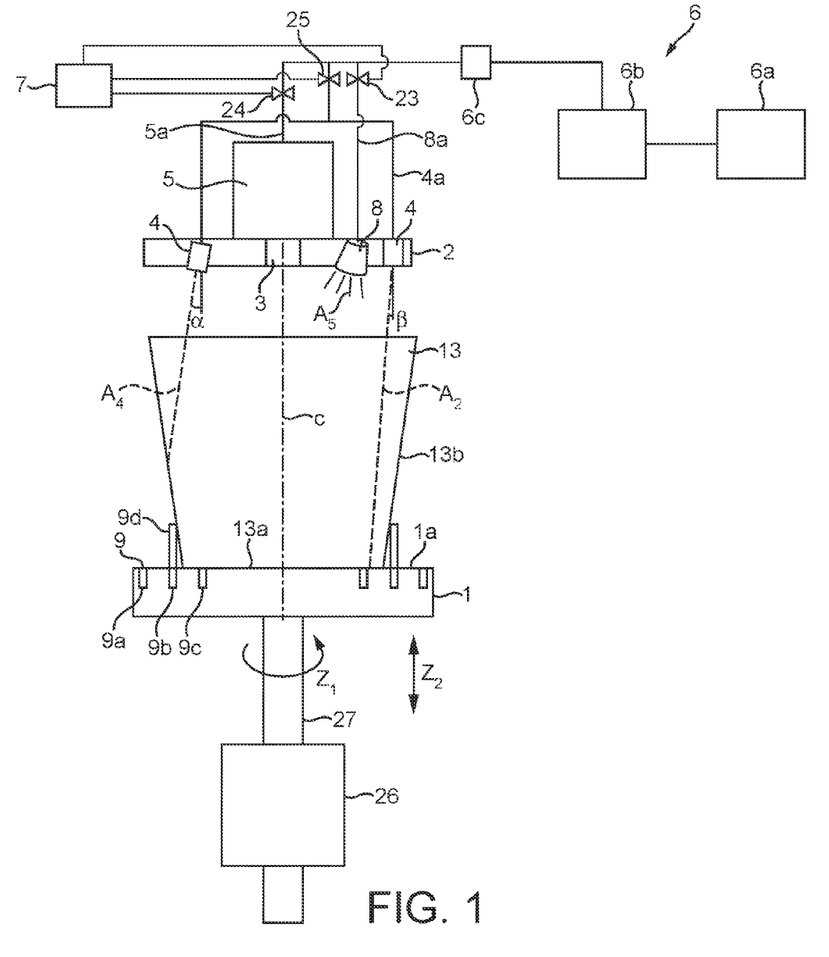
FIG. 1 shows a schematic side view of a preferred embodiment of the device according to the present invention.

FIG. 1 is a schematic side view of a preferred embodiment of the device according to the present invention. As can be seen in FIG. 1, a plate member 2 comprises four outlet nozzles 4. In addition, the plate member comprises an outlet 3 which is in fluid connection to a coffee mixing chamber 5 which is mounted on the plate member.

The plate member 2 preferably comprises a spray nozzle 8 which is designed to inject a spray A5 towards a receptacle placed beneath the plate member 2.

The outlet nozzles 4, the spray nozzle 8 and the mixing chamber 5 are in fluid connection to liquid supply means 6 of the device.

The liquid supply means preferably comprise a water tank 6a respectively a reservoir suitable for providing a liquid to the device. It should be noted that instead of a reservoir, the device may be connected to a water tap in order to establish a permanent liquid supply.

The liquid supply means comprise a pump 6b which is in connection to the reservoir and which provides liquid to a boiler 6c of the water supply means 6. Thereby, instead of a boiler, a thermo block or other suitable heating means may be provided. According to this embodiment, the water supply means are designed for supplying a heating pressurized liquid.

In a preferred embodiment however, a by-pass water path (not shown) may be provided in order to by-pass the heating means 6c and thus for providing a pressurized cold water to the outlet nozzles 4 respectively to the spray nozzle 8.

The fluid connection between the liquid supply means 6 and the outlet nozzles 4 respectively the spray nozzle 8 and the mixing chamber 5 is established by means of tubular members 4a, 5a, 8a which are schematically shown in FIG. 1.

Within the fluid connection between the mixing chamber 5, the outlet nozzles 4 and the spray nozzle 8, valve members 23, 24, 25 are arranged. The valve members have at least an open and a closed position in which a liquid flow from the liquid supply means to the outlet nozzles 4, the spray nozzle 8 or the mixing chamber 5 is enabled or disabled respectively. Thereby, the valve members 23, 24, 25 are preferably connected to a control unit 7 which controls the position of the valve members. Accordingly, liquid may be selectively provided to the outlet nozzles 4, the spray nozzle 8 and the mixing chamber 5.

However, it may as well be possible to have only one valve member, e.g. valve member 23, connected between the liquid supply means 6 and the outlet nozzles 4. Thereby, the outlet nozzles 4 are in fluid connection to a single tubular member, e.g. tubular member 4a, connected to the valve member 23. The tubular member 4a may for example be connected to a circular channel in the plate member 2, said circular channel emerging in the different outlet nozzles. Due to the outlet nozzles 4 being in fluid connection to the tubular member 4a, distribution of liquid from the tubular member 4a to the outlet nozzles 4 is enabled.

It should be understood that the outlet nozzles 4 may comprise any means suitable for directing a fluid jet towards the receptacle 13. The outlet nozzles 4 may protrude to a certain extent from the plate member 2. However, the outlet nozzles may as well be formed as an integral part of the plate member, such as for example holes formed in the plate member 2. The holes can be of different size to provide different water pressures.

As can be seen in FIG. 1, a liquid supply to the outlet nozzles 4 results in a jet of liquid A2, A4 being ejected from the corresponding outlet nozzles 4. Thereby, the outlet nozzles are preferably arranged at the plate member 2 such that the fluid jets A2 is directed to a bottom portion 13a of a receptacle 13 placed on a support means 1 beneath the plate member 2. Moreover, at least one of the outlet nozzles 4 is arranged such that the ejected fluid jet A4 hits a sidewall portion 13b of the receptacle 13. Thereby, the fluid jet which is directed to a bottom portion 13a of the receptacle 13 provides the essential force for dissolving a food substance which is preferably provided in powder form to the receptacle. Moreover, the fluid jet directed to a sidewall portion 13b of the receptacle is able to prevent food substance from sticking to the sidewall of the receptacle.

In a preferred embodiment, the outlet nozzles 4 are preferably arranged at a fixed position at the plate member 2. However, adjusting means may be provided for adjusting the position of the outlet nozzles 4 and thus, for adjusting the paths of the fluid jets ejected there from.

The receptacle 13 is preferably placed centrically to the outlet nozzles 4. According to this, the ejected fluid jets are directed to the intended portions of the receptacle 13, as already described.

In order to enable a correct positioning of the receptacle 13 with respect to the plate member 2 positioning means 9 are provided which enable a guidance of the receptacle toward a correct position of the receptacle.

The positioning means 9 preferably comprise annular grooves 9a, 9b, 9c which are arranged concentrically. Therein, an annular ring member 9d may be placed which preferably can be adjusted to different sizes in order to fit the different grooves 9a, 9b, 9c. Hence, the ring member 9d protrudes to a predefined extent from an upper surface 1a of the support means 1. Accordingly, dependent on the size of the receptacle 13 to be used with the present device, a user may adjust the ring member 9d to fit in one of the provided grooves 9a, 9b, 9c and thus, to guide a lower portion of the receptacle 13 in order to enable a concentric positioning of the receptacle 13 with respect to the plate member 2.

It should be understood that the positioning means may be any means for supporting a user of the device in positioning the receptacle with respect to the plate member 2. Moreover, the number of grooves interacting with the protruding ring member 9d may vary from the number indicated in the figure.

The support means 1 are preferably connected to a rotating and lifting device 27 which is connected to a motor 26. Thereby, the motor 26 is preferably controlled by the controlling unit 7 of the device in order to enable an operation of the rotating and lifting device 27 during a beverage preparation cycle as indicated by arrows Z1 and Z2 in FIG. 1.

Figure 2:
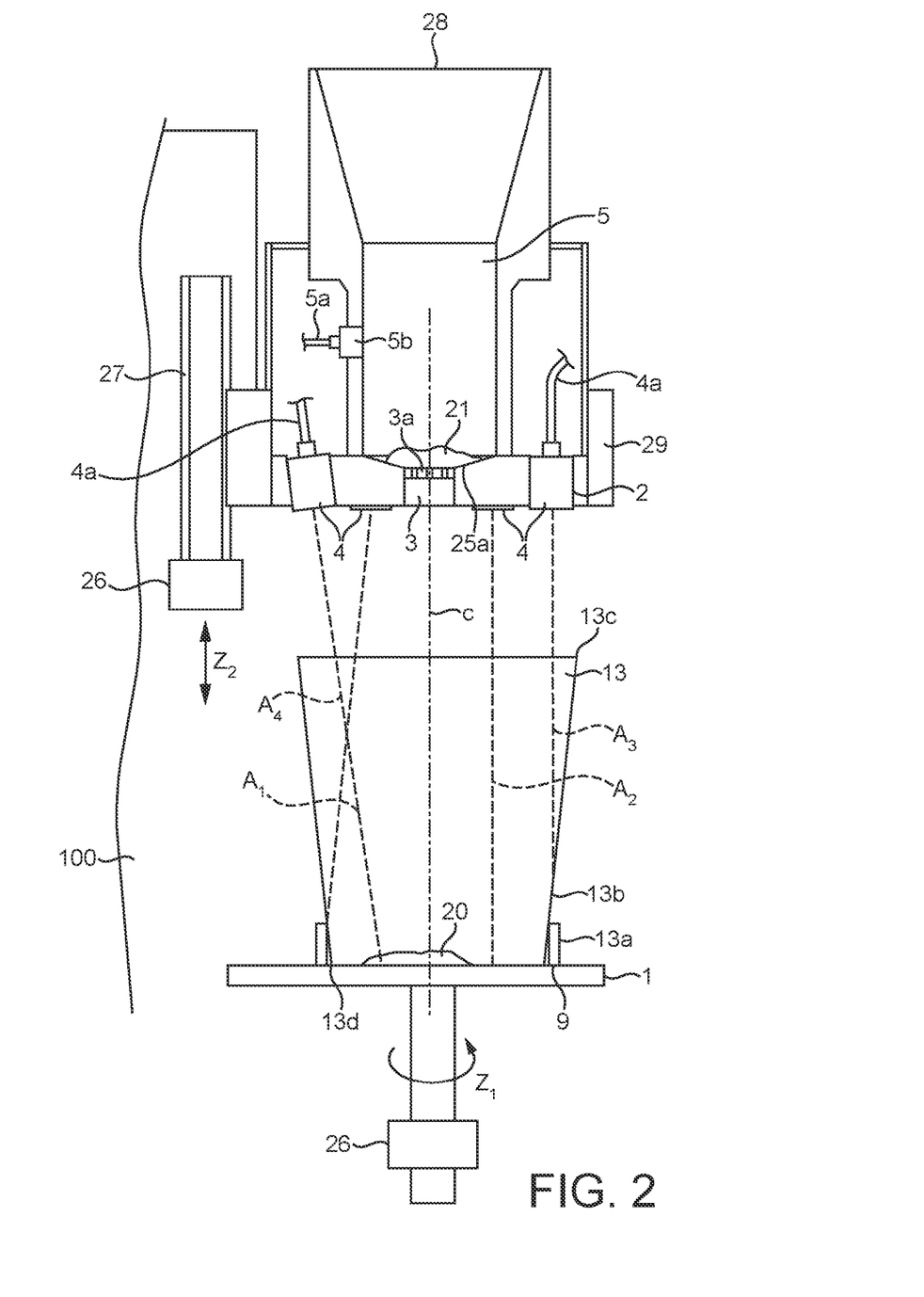
FIG. 2 shows a side view of another preferred embodiment of the device according to the present invention.

FIG. 2 relates to a side view of another preferred embodiment of the device according to the present invention. Therein, the lifting device is connected to the plate member 2 by means of a connection element 29 which is circumferentially arranged at the plate member 2 and which is connected to a lifting means 27 housed within a housing 100 of the device. The motor 27 is preferably controlled by the controlling unit 7 of the device in order to enable an operation of the lifting device during a beverage preparation cycle as indicated by arrow Z2. The support means 1 are preferably connected to a rotating device 27 which is connected to a motor 26 and enabling the rotation of the receptacle about its central axis C. Thereby, the motor 26 is preferably controlled by the controlling unit 7 of the device in order to enable an operation of the rotating device 27 during a beverage preparation cycle as indicated by arrow Z1.

As shown in FIG. 2, the mixing chamber 5 comprises an aperture 28 and is thus accessible for a user of the device. Thereby, the aperture 28 may be equipped with a lid (not shown) in order to enable an opening and closing of the mixing chamber 5. The mixing chamber 5 is preferably cylindrically shaped and comprises an outlet 3 at a lower portion thereof. Moreover, at an elevated position within the mixing chamber 5, a water inlet 5b is arranged which is in fluid connection to the liquid supply means by means of a tubular member 5a.

Hence, for the preparation of a coffee beverage, a coffee based concentrate dose such as coffee powder 21 may be provided to the mixing chamber 5 by means of the aperture 28. Then, a liquid, preferably hot pressurized water, is introduced into the mixing chamber 5. Hence, the provided liquid interacts with the coffee powder 21 in order to form a coffee beverage which is dispensed from the mixing chamber 5 by means of the outlet 3.

The coffee beverage is thus provided to the receptacle 13 which is placed underneath the plate member 2. Thereby, the outlet 3 is preferably arranged concentrically to the plate member 2.

The outlet 3 may be equipped with a perforated member 3a for preventing the coffee powder 21 from falling into the receptacle before the interaction of the powder 21 with the liquid.

Moreover, for the preparation of a mixed beverage such as a cappuccino or latte macchiato which basically consists of coffee and milk, the milk is prepared within the receptacle by means of an in-cup-preparation thereof.

Accordingly, a food substance such as a dry powder may be provided to the receptacle 13 prior to the beverage preparation. Then, liquid in form of fluid jets A1, A2, A3, A4 is provided to the receptacle 13 in order to dissolve the food substance 20 therein.

For the beverage preparation within the receptacle 13, the plate member 2 preferably comprises four outlet nozzles 4, wherein at least two of the other nozzles A1, A2 are arranged in order to direct a fluid jet to a bottom portion 13a of the receptacle. Moreover, preferably two of the outlet nozzles 4 are arranged in order to provide a fluid jet A3,A4 to an inner side wall portion 13b of the receptacle 13. Hence, effective dissolving of the food substance 20 within the receptacle 13 is obtained.

In a preferred embodiment, the plate member 2 is brought to approach an upper rim portion 13c of the receptacle prior to the provision of liquid to the receptacle. Hence, the pressure of the fluid jets which hit the surface area of the liquid within the receptacle during the beverage preparation is reduced and thus, mixing of the beverage is enhanced. Moreover, the formation of big bubbles due to the impact of the fluid jets and the surface of a liquid within the receptacle 13 is reduced.

With increasing filling level of the liquid within the receptacle 13, the plate member 2 and thus the outlet nozzles 4 can be lifted with respect to receptacle 13. Thereby, the plate member 2 is preferably rotated about the receptacle central axis C by means of the lifting/rotating means 27. According to this, the fluid jets ejected by the outlet nozzles 4 of the plate member 2 are provided to different portions of the receptacle 13 and thus, mixing of the beverage is enhanced. In particular, the fluid jets provided to a side wall portion 13b of the receptacle 13 are provided continuously to an inner circumferential portion of the receptacle 13. Hence, any residual of the food substance which sticks to an inner side wall portion of the receptacle 13 is washed away.

Control means 7 (see FIG. 1) preferably comprise a state machine which enables the control of the liquid supply to the outlet nozzles 4, the spray nozzle 8 and the mixing chamber 5 respectively. Therefore, during a beverage preparation side of a mixed beverage, the control means 7 first provide liquid to the outer nozzles 4 and thus to the receptacle 13 in order to dissolve and eventually froth a food substance provided to the receptacle. Thereby, the amount of liquid provided to the receptacle is preferably controlled by a flow metering device (not shown) connected within the liquid flow path of the liquid supply means 7 and the outlet nozzles 4. Thereby, a user can be able to choose the volume of the liquid to be dispensed into the receptacle 13 by means of a manual interface provided at the device (not shown) or the volume settled for the type of beverage selected by the user can be automatically dispensed according to a predefined program.

After the liquid supply to the receptacle 13 by means of the outlet nozzles 4 is stopped, the liquid supply to the mixing chamber 5 by means of the inlet 5b is enabled. Accordingly, any food substance such as dry coffee powder provided to the mixing chamber 3 interacts with the provided liquid and is thus dispensed through the outlet 3 into receptacle 13. Between the inlet 5b and the liquid supply means, a flow metering device is preferably arranged in order to control the amount of liquid provided to the mixing chamber 5. Thereby, a user is preferably enabled by a manual interface provided at the device (not shown) to control the amount of liquid to be provided to the mixing chamber 5 or the volume settled for the type of beverage selected by the user can be automatically dispensed according to a predefined program.

In addition, the spray nozzle 8 may be supplied with liquid after liquid supply to the outlet nozzles 4 has been cut by the control means 7. Hence, the spray of vapour provided by the spray nozzle is applied to the beverage within the receptacle 13 in order to subdue big bubbles. Furthermore, the spray of vapour supports the formation of small bubbles on the surface of the beverage which is particularly desired for cappuccino type beverages.

In order to enable an efficient mixing of the beverage within the receptacle 13, the outlet nozzles 4 and thus the ejected fluid jets are arranged at a certain angle $\alpha$, $\beta$ (see FIG. 1) with respect to the vertical. Thereby, the angle $\alpha$ preferably differs for each of the outlet nozzles 4 designed to direct a fluid jet A1, A2 to the bottom of the receptacle 13a. Moreover, the angle $\beta$ preferably differs for each of the outlet nozzles 4 designed to direct a fluid jet A3, A4 to an inner side wall 13b of the receptacle 13. In a preferred embodiment, the angles $\alpha$, $\beta$ are between −10 and +10 degrees.

In a preferred embodiment, a first nozzle 4 is arranged in parallel to the vertical C ($\beta$=0). Moreover, a second outlet nozzle is arranged at an angle of $\beta$=−10° to the vertical. In addition, a third outlet nozzle 4 is arranged at an angle $\alpha$ of 3° to the vertical. A fourth outlet nozzle is arranged at an angle $\alpha$ of 10°. The values for the angles $\alpha$, $\beta$ may vary without departing from the scope of the invention.

In a preferred embodiment, a fifth outlet nozzle 11 is arranged at the plate member 2 and is in fluid connection to the liquid supply means 6. Preferably, said fifth outlet nozzle 11 differs in diameter to the other outlet nozzles 4. In particular, the outlet nozzle 11 has a greater diameter in order to provide a bigger amount of a liquid with a lower pressure to the receptacle during the beverage preparation cycle. Accordingly, waiting time for a user of the device is reduced and frothing force of the jet is reduced. The outlet nozzle 4 is in particular useful for the preparation of tea.

Figure 3:
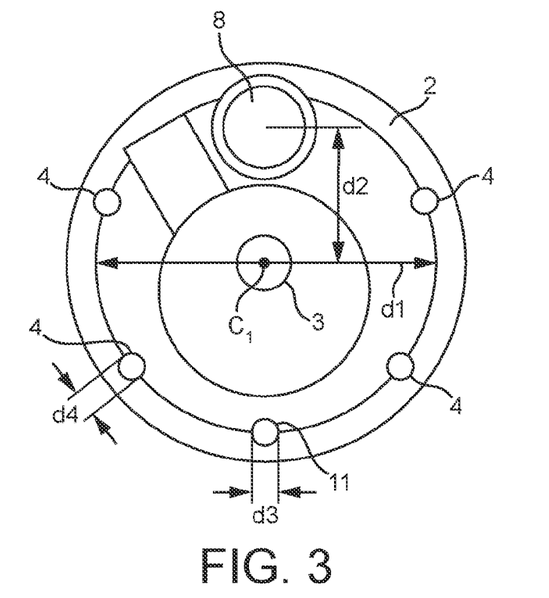
FIG. 3 shows a bottom view of a preferred embodiment of the plate member housing the outlet nozzles and the outlet of the coffee mixing chamber.

FIG. 3 is a bottom view of a preferred embodiment of the plate member 2 housing the outlet nozzles 4 and the outlet of the coffee mixing chamber 3. As can be seen in the figure, the outlet nozzles 4 are circumferentially positioned on a ring and the outlet 3 of the mixing chamber 5 is arranged centrically to the centre C1 of the ring in which nozzle outlets 4 are positioned.

The outlet nozzles 4 are preferably of the same outlet diameter d4 thus producing fluid jets of the same pressure. The outlet diameter d4 is preferably between 0.2 and 0.9 mm.

Said outlet nozzles 4 are arranged on the same distance d1 compared to the centre C1 of the plate member 2. Said distance d1 is preferably between 30 and 60 mm.

The spray nozzle 8 is preferably situated at a smaller distance d2 to the centre c1 of the plate member 2. Thereby, the distance d2 is preferably between 20 and 50 mm. The spray nozzle preferably ejects a hollow cone spray of vapour with an angle of 60 to 85°. The liquid flow of the spray nozzle is preferably between 1.5 and 3 ml per second.

The outlet nozzle 11 is of a greater diameter d3 than the outlet nozzles 4 and is preferably arranged at the same distance d1 from the centre c1 of the plate member 2. The diameter d3 is preferably between 1.5 and 4 mm.

Preferably, the speed of rotation of the plate member 2 is between 0.5 and 1.5 revolutions per second. More preferably, the speed of rotation of the plate member is between 0.8 and 1.2 revolutions per second.

Figure 4:
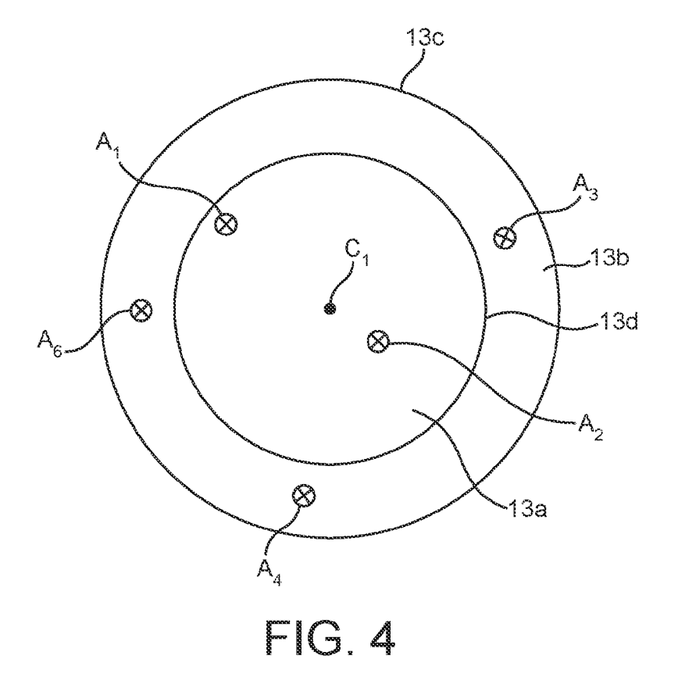
FIG. 4 shows a top view of a preferred embodiment of a receptacle to be used with the present invention, wherein the impact points of the fluid jets ejected by the outlet nozzles and the outlet of the coffee mixing chamber are indicated.

FIG. 4 is a top view of a preferred embodiment of a receptacle to be used with the present invention, wherein the impact points of the fluid jets A1, A2, A3, A4 ejected by the outlet nozzles 4 are indicated.

The outlet of the mixing chamber 5 preferably hits the bottom portion 13a of the receptacle 13 at its centre C1. Moreover, as indicated by reference numerals A3 and A4, preferably two of the fluid jets provided by the outlet nozzles 4 hit a side wall portion 13b of the receptacle. Thereby, the distance of the impact points of the fluid jets A3, A4 from the centre c1 preferably differs.

In addition, the reference numerals A1 and A2 refer to impact points of two fluid jets ejected by outlet nozzles 4 which are arranged to hit a bottom portion 13a of the receptacle 13. Thereby, as indicated in FIG. 4, the distance of the impact points A1, A2 from the centre C1 preferably differ. Accordingly, different portions of the bottom portion of the receptacle are hit by fluid jets which results in an improvement of the mixing process. Moreover, due to the rotation of the plate member 2, the fluid jets are continuously rotating about the axis C of the receptacle, thereby inducing a swirling motion within the receptacle. Accordingly, enhanced mixing of the beverage to be prepared is enhanced.

The reference numeral A6 denotes the impact point of the additional nozzle 11 which preferably has a greater outlet diameter than the other outlet nozzles. Preferably, the outlet nozzle 11 is arranged to direct a fluid jet towards a side wall portion 13b of the receptacle.

Figure 5:
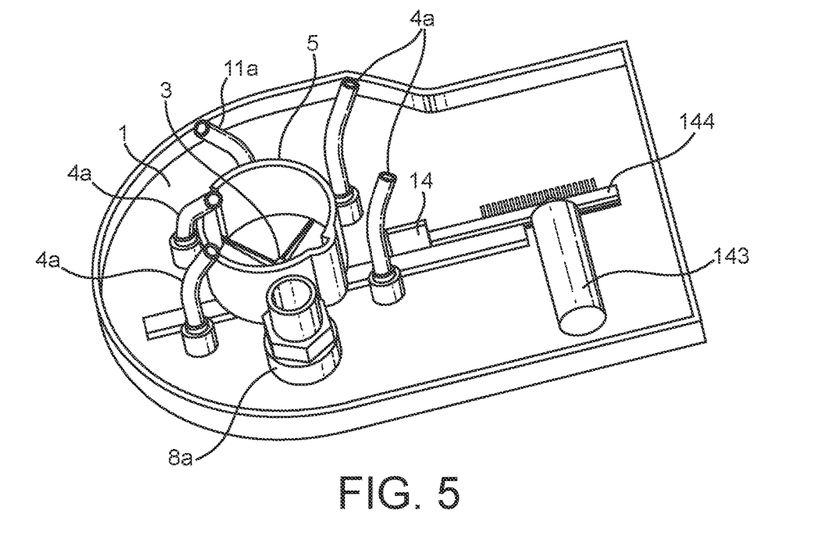
FIGS. 5 and 6 respectively show a top view and a bottom of the device according to the present invention wherein means for closing, opening or restricting the coffee mixing chamber are apparent.

FIG. 5 is a top view of the plate member 2 to which the tubular members 4a, 5a, 8a supplying the outlet nozzles and the spray nozzle are connected. The coffee mixing chamber 5 lies on the plate so that its outlet emerges through the plate.

Figure 6:
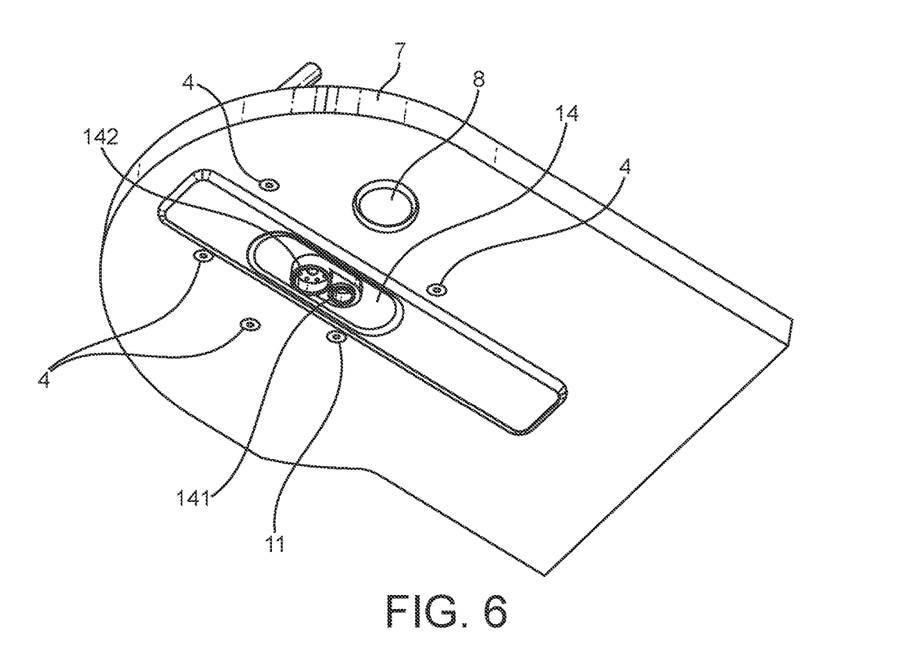

FIG. 6 is a bottom view of the of the plate member 2 in which the outlet nozzles 4, 11 and the spray nozzle 8 are apparent. Under the coffee mixing chamber outlet 3, there are means for closing, opening or restricting said outlet nozzle. Said means consists in a plate 14 pierced by a hole 142 of which section is almost as large as the section of the coffee mixing chamber outlet 3 and by a restricted hole 141 of which section is smaller than the section of the coffee mixing chamber outlet 3. This plate 14 is moveable so that either the hole 142 or the restricted hole 141 or no hole at all faces the coffee mixing chamber outlet 3. This plate can be moved by a motor 143 of which notched gear is assembled with a notched plate 144 fixed to the plate 14. Motor 143 can then move the plate to open, close or restrict the coffee mixing chamber outlet.

Although the present invention has been described with reference to preferred embodiments thereof, many modifications and alternations may be made by a person having ordinary skill in the art without departing from the scope of this invention which is defined by the appended claims.

The invention claimed is:

1. A beverage production device for preparing a beverage from a beverage concentrate contained in a receptacle, comprising:
   a support for supporting the receptacle;
   a motor that rotates the support; and
   a plate member positioned vertical to the support, the plate member comprising at least two outlet nozzles for injecting a fluid jet into the receptacle, a liquid supply connected to the outlet nozzles, at least one of the outlet nozzles designed to direct a fluid jet to an inner side wall of the receptacle, at least one of the outlet nozzles designed to direct a fluid jet to the bottom of the receptacle, and the plate member comprising an outlet in connection with a coffee mixing chamber for injecting coffee into the receptacle, the coffee mixing chamber being mounted on the plate member.

2. The beverage production device of claim 1, wherein the outlet nozzles have angles between −10° and +10° relative to the vertical.

3. The beverage production device of claim 1, wherein the plate member and the support are configured so as to be movable relative to each other vertically.

4. The beverage production device of claim 1, wherein the support comprises a positioning member for enabling a centered positioning of the receptacle with respect to the plate member.

5. The beverage production device of claim 4, wherein the positioning member comprises annular grooves arranged concentrically and into which a ring member is positioned.

6. The beverage production device of claim 1, comprising means for closing, opening or restricting the outlet nozzle in connection with the coffee mixing chamber.

7. The beverage production device of claim 1, comprising a lifting device connected to the plate member by a connection element circumferentially arranged at the plate member.

8. The beverage production device of claim 1, wherein the motor performs the rotation during vertical lifting of the plate member.

* * * * *